Patented May 2, 1933

1,907,281

UNITED STATES PATENT OFFICE

KARL THIESS AND THEODOR MEISSNER, OF FRANKFORT-ON-THE-MAIN, GERMANY, ASSIGNORS TO GENERAL ANILINE WORKS, INC., OF NEW YORK, N. Y., A CORPORATION OF DELAWARE

NEW VALUABLE INDIGOID VAT DYESTUFFS

No Drawing. Application filed March 31, 1932, Serial No. 602,405, and in Germany April 16, 1931.

The present invention relates to new valuable indigoid vat dyestuffs, more particularly it relates to compounds of the following general formula:

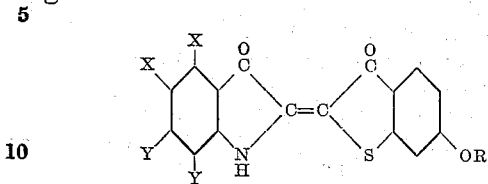

wherein R stands for an alkyl group and the two X's or the two Y's represent a further condensed benzene nucleus.

The new dyestuffs are distinguished by a great tinctorial power and good fastness properties, especially by a comparatively very good fastness to light. The dystuffs, when applied to the fiber with a reducing agent, are rapidly fixed on being steamed and they, therefore, are valuable in cloth printing.

The new compounds may be prepared in various manners. Thus, for instance, a 1.2- or a 2.1-naphthisatin-alpha-compound may be condensed with 6-alkoxy-3-hydroxythionaphthene or 1.2- or 2.1-naphthindoxyl may be condensed with a 6-alkoxy-3-hydroxy-1-thionaphthene-alpha-compound. The condensation may be performed in the presence of a solvent or a diluent.

The following examples serve to illustrate the invention, but they are not intended to limit it thereto, the parts being by weight:

(1) 20 parts of 2.1-naphthisatin are warmed with 24 parts of phosphorus pentachloride in 250 parts of chlorobenzene and thus transformed into 2.1-naphthisatin-alpha-chloride. To this suspension a warm solution of 18 parts of 6-methoxy-3-hydroxy-1-thionaphthene in chlorobenzene is added at 80° C. to 90° C. The dyestuff at once precipitates in the form of crystals. By shortly warming on the steam-bath, the condensation is finished. The solution is allowed to cool and the dyestuff is filtered with suction, washed first with a small quantity of chlorobenzene and then with alcohol and dried. 6-methoxy-2-thionaphthene-4.5-benz-2-indolindigo dissolves in concentrated sulfuric acid to a blue solution and in hot chlorobenzene or hot nitrobenzene to a red solution. It dyes the fiber, from a yellow vat, olive-green tints and is well suited for being used in cloth-printing. It has the following formula:

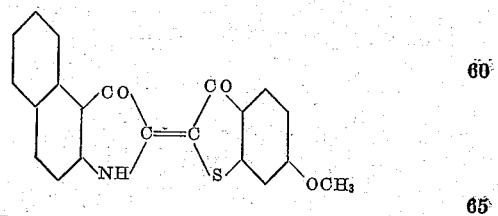

(2) By using in Example 1 instead of 6-methoxy-3-hydroxy-1-thionaphthene 19.4 parts of 6-ethoxy-3-hydroxy-1-thionaphthene and proceeding in the manner indicated in that example, there is obtained 6-ethoxy-2-thionaphthene-4.5-benz-2-indolindigo which has properties very similar to those of the dyestuff obtainable according to Example 1.

Similar dyestuffs may also be obtained, by using instead of the methoxy- and ethoxy compounds other alkoxy compounds as, for instance, the propyloxy- or butyloxy compounds.

(3) 20 parts of 1.2-naphthisatin are transformed into 1.2-naphthisatin-alpha-chloride by warming with 24 parts of phosphorus-pentachloride in 250 parts of chlorobenzene. To the emulsion obtained there is introduced at 80° C. to 90° C. a warm solution of 18 parts of 6-methoxy-3-hydroxy-1-thionaphthene in chlorobenzene. 6-methoxy-2-thionaphthene-6.7-benz-2-indolindigo precipitates at once in the form of crystals. By shortly heating on the steam-bath, the condensation is finished and the product is worked up as described in Example 1. The dyestuff dyes the fiber from a yellow vat olive-green tints similar to those obtained with the dyestuff of Example 1. Its other properties are identical with those of the dyestuff of Example 1 and it corresponds with the following formula:

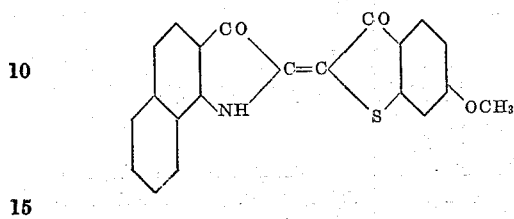

(4) 18.3 parts of 2.1-naphthindoxyl (obtainable according to the process described in "Berichte der deutschen, chemischen Gesellschaft", vol. 31, page 1816) are heated in a reflux apparatus with 31.2 parts of 6-methoxy-3-hydroxythionaphthene-2-para-dimethylaminoanil in 300 parts of boiling chlorobenzene, while stirring, until an increase of the formation of the dyestuff can no longer be detected. After cooling, the 6-methoxy-2-thionaphthene-4.5-benz-2-indolindigo which has been formed, is filtered by suction, washed first with chlorobenzene and then with alcohol and dried. It is identical with the dyestuff obtainable according to Example 1.

We claim:

1. As new products, the compounds of the following general formula:

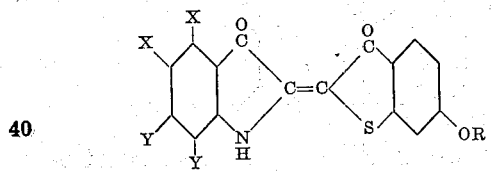

where R stands for an alkyl group and the two X's or the two Y's represent a further condensed benzene nucleus, said dyestuffs having a great tinctorial power and good fastness properties, especially to light, and being suitable for use in cloth printing.

2. As new products, the compounds of the following general formula:

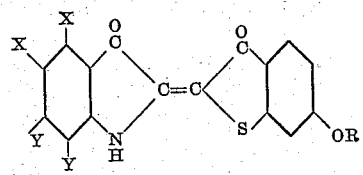

wherein R stands for methyl or ethyl and the two X's or the two Y's represent a further condensed benzene nucleus, said dyestuffs having a great tinctorial power and good fastness properties, especially to light, and being suitable for use in cloth printing.

3. As a new product, the compound of the following formula:

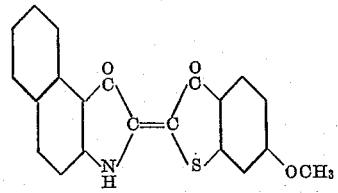

dissolving in concentrated sulfuric acid to a blue solution and in hot chlorobenzene or hot nitrobenzene to a red solution, dyeing the fiber from a yellow vat olive-green tints and being valuable for use in cloth-printing.

4. As a new product, the compound of the following formula:

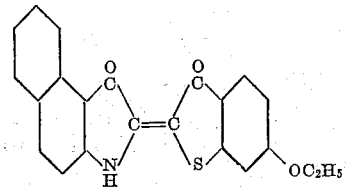

dissolving in concentrated sulfuric acid to a blue solution and in hot chlorobenzene or hot nitrobenzene to a red solution, dyeing the fiber from a yellow vat olive-green tints and being valuable for use in cloth-printing.

5. As a new product, the compound of the following formula:

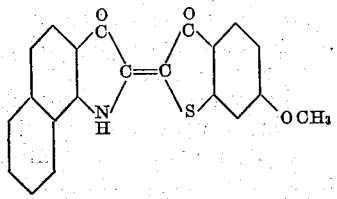

said dyestuff having a great tinctorial power, dissolving in concentrated sulfuric acid to a blue solution and in hot chlorobenzene or hot nitrobenzene to a red solution, dyeing the fiber from a yellow vat olive-green tints and being valuable for use in cloth-printing.

In testimony whereof, we affix our signatures.

KARL THIESS.
THEODOR MEISSNER.